United States Patent
Suzuki

[11] Patent Number: 5,982,988
[45] Date of Patent: Nov. 9, 1999

[54] EXPOSURE CONTROL APPARATUS OF PHOTO-PRINTER

[75] Inventor: Kenji Suzuki, Kanagawa, Japan

[73] Assignee: Fuji Photo Film Co., Ltd., Kanagawa, Japan

[21] Appl. No.: 08/795,784

[22] Filed: Feb. 5, 1997

[30] Foreign Application Priority Data

Feb. 5, 1996 [JP] Japan .................................. 8-019057
Feb. 5, 1996 [JP] Japan .................................. 8-019058

[51] Int. Cl.⁶ .................................................. G06F 15/00
[52] U.S. Cl. ......................... 395/109; 395/106; 382/162
[58] Field of Search .................. 358/515, 512, 358/509, 518; 382/162, 166, 167; 348/275; 395/106, 109

[56] References Cited

U.S. PATENT DOCUMENTS

| | | | |
|---|---|---|---|
| 4,120,581 | 10/1978 | Takahashi et al. | 355/38 |
| 4,203,671 | 5/1980 | Takahashi et al. | 356/402 |
| 4,242,700 | 12/1980 | Weimer | 358/44 |
| 4,692,794 | 9/1987 | Suzuki | 358/44 |
| 4,709,259 | 11/1987 | Suzuki | 358/48 |
| 4,769,677 | 9/1988 | Matsujmoto | 355/38 |
| 4,802,107 | 1/1989 | Yamamato et al. | 364/525 |
| 4,809,198 | 2/1989 | Terashita | 364/525 |
| 5,122,831 | 6/1992 | Suzuki | 355/37 |
| 5,337,130 | 8/1994 | Satoh | 355/77 |

FOREIGN PATENT DOCUMENTS

| | | | |
|---|---|---|---|
| 52-156624 | 12/1977 | Japan | G03B 27/72 |
| 52-156625 | 12/1977 | Japan | G03B 27/72 |
| 63-278047 | 11/1988 | Japan | G03B 27/72 |

*Primary Examiner*—Jerome Grant, II
*Attorney, Agent, or Firm*—Sughrue, Mion, Zinn, Macpeak & Seas, PLLC

[57] ABSTRACT

An imaging device is provided for detecting color image data to use for displaying a video image simulating a consequent photo-print of an original frame to be printed. A photometric device is provided for measuring three color densities of the original frame. The dynamic range of the imaging device is changed in accordance with the three color densities measured by the photometric device. A main area of the original frame is extracted based on the color image data detected by the imaging device, and three color densities of the main area are extracted from the three color densities measured by the photometric device, and are used for calculating print-exposure amounts of three colors.

14 Claims, 4 Drawing Sheets

EXPOSURE CONTROL APPARATUS OF PHOTO-PRINTER

BACKGROUND OF THE INVENTION

1. Field of the Invention

The present invention relates to an exposure control apparatus of a photo-printer, and more particularly to an exposure control apparatus of a photo-printer, which detects three color image data from an original frame to be printed, to determine print-exposure amounts of three colors, and displays a positive video image simulating a consequent photo-print that will be made from the original frame.

2. Background Arts

It is known in the field of photo-printers to extract image characteristic amounts of three primary colors from an original frame of a photo film, e.g. a color negative film, and calculate three color exposure amounts in accordance with the image characteristic amounts. Based on the three color exposure amounts, the quantity and quality of printing light are controlled to make a photo-print at proper color balance and density. It is also known in the art to extract a main subject from the original frame. For example, JPA 63-278047 discloses that the type of the main subject is manually entered to locate a point of the main subject of the original frame on a video monitor which displays a simulation image of a photo-print made from the original frame, that a main subject area of a given size is determined around the located point, that image characteristic amounts are calculated from photometric values of those pixels which constitute the main subject area, and that three color exposure amounts are calculated from the image characteristic amounts of the main subject area by use of an operation formula that is predetermined for each type of main subject.

Meanwhile, to detect color image data useful for simulating a consequent photo-print on a video monitor, a high-density image area sensor having hundreds of thousands of pixels is necessary. On the other hand, to detect photometric values useful for the exposure control in the photo-printer, spectral characteristics of a photometric system is required to be as equal to those of the used color photographic paper as possible. Therefore, the photometric system for exposure control needs to use an optical filter whose spectral characteristics are defined by inorganic deposit layers.

In view of the above two requirements, a three chip image sensing device has conventionally been used for picking up color image data from the original frame. The three chip image sensing device is provided with a three color separation prism having a deposit color separation system, i.e. inorganic three color filters. The color image data detected through the image sensing device is used for simulating the photo-print, and is also processed to obtain data necessary for controlling exposure. The conventional three chip image sensing device using the three color separation prism is complicated in construction, and expensive. Also, it is difficult to produce a color separation filter consisting of three color filters arranged in a mosaic pattern from inorganic deposit layers when the color image area sensor should have a large number of pixels, i.e. hundreds thousand of pixels. Moreover, pixel thinning and averaging the color image data in the unit of hundreds of thousands of pixels take a certain operation time, thereby elongating the image processing time per frame.

SUMMARY OF THE INVENTION

In view of the foregoing, a prime object of the present invention is to provide an exposure control apparatus of a photo-printer, which determines three color exposure amounts based on color image data of an original frame with accuracy, and also simulates a consequent photo-print of the original frame on a video monitor with accuracy, but with a simple construction and at a low cost.

To achieve the above object, an exposure control apparatus for a printer according to the present invention is provided with a photometric device for measuring three color densities of an original frame recorded on photo film; an imaging device for detecting color image data of the original frame for displaying a video image; a condition determining device for determining imaging conditions of the imaging device in accordance with the three color densities measured by the photometric device; a main area extracting device for extracting a main area of the original frame based on the color image data detected through the imaging device under the determined imaging conditions; and an exposure determining device for determining print-exposure amounts of three colors by use of three color densities of the main area.

By controlling the imaging condition according to the three color densities of the original frame, the color image data of any original frame, including over-exposed and under-exposed original frame, can be processed in the same conditions as the standard frame. By extracting the main area of the original frame based on the color image data, and using the three color densities of the main area for determining the print-exposure amounts, the quality of the photo-print is improved particularly in the main area as containing the most important subject.

According to a preferred embodiment, the imaging device is comprised of a single chip color image area sensor, and the single chip color image area sensor consists of a color separation filter consisting of organic three color filters arranged in a mosaic pattern. On the other hand, the photometric device is comprised of three photo sensors for the three colors. Each of the three photo sensors consists of a photoelectric element and a color deposit filter disposed in front of the photoelectric element, and the three color deposit filters have spectral characteristics which are approximately equal to the spectral sensitivity of the color paper.

This configuration can achieve three color density measurement at a low cost, while adapting the spectral characteristics of the photometric device to the spectral sensitivity of the color paper. Also, it is unnecessary to make pixel thinning and average the color image data in the unit of hundreds of thousands of pixels, so that the image processing time per frame is saved.

According to another embodiment, the photometric device is comprised of a first single chip color image area sensor having a smaller number of pixels than necessary for detecting color image data useful for simulating the photo-print, whereas the imaging device is comprised of a second single chip color image area sensor having a large number of pixels necessary for detecting the useful color image data.

It is preferable to provide the second single chip color image area sensor with a color separation filter consisting of organic three color filters arranged in a mosaic pattern in correspondence with the pixels of the second single chip color image area sensor. This type color image area sensor can be a video image sensor that is commercially available at a low cost. On the other hand, it is preferable to provide the first single chip color image area sensor with a color separation filter consisting of three color deposit filters arranged in a mosaic pattern in correspondence with the pixels of the first single chip color image area sensor. The three color deposit filters are adapted to have spectral characteristics which are approximately equal to a spectral sensitivity of a color paper to record the photo-print thereon.

As described above, it is difficult to produce a color separation filter consisting of three color filters arranged in a mosaic pattern from the deposit layers when the color image area sensor should have a large number of pixels, i.e. hundreds of thousands of pixels, that is necessary for detecting color image data useful for simulating a consequent photo-print. According to this embodiment, the number of pixels of the first color image area sensor may be in the range of hundreds, and hence the size of each pixel can be relatively large, so that it is easy to produce the color separation filter from the deposit layers.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
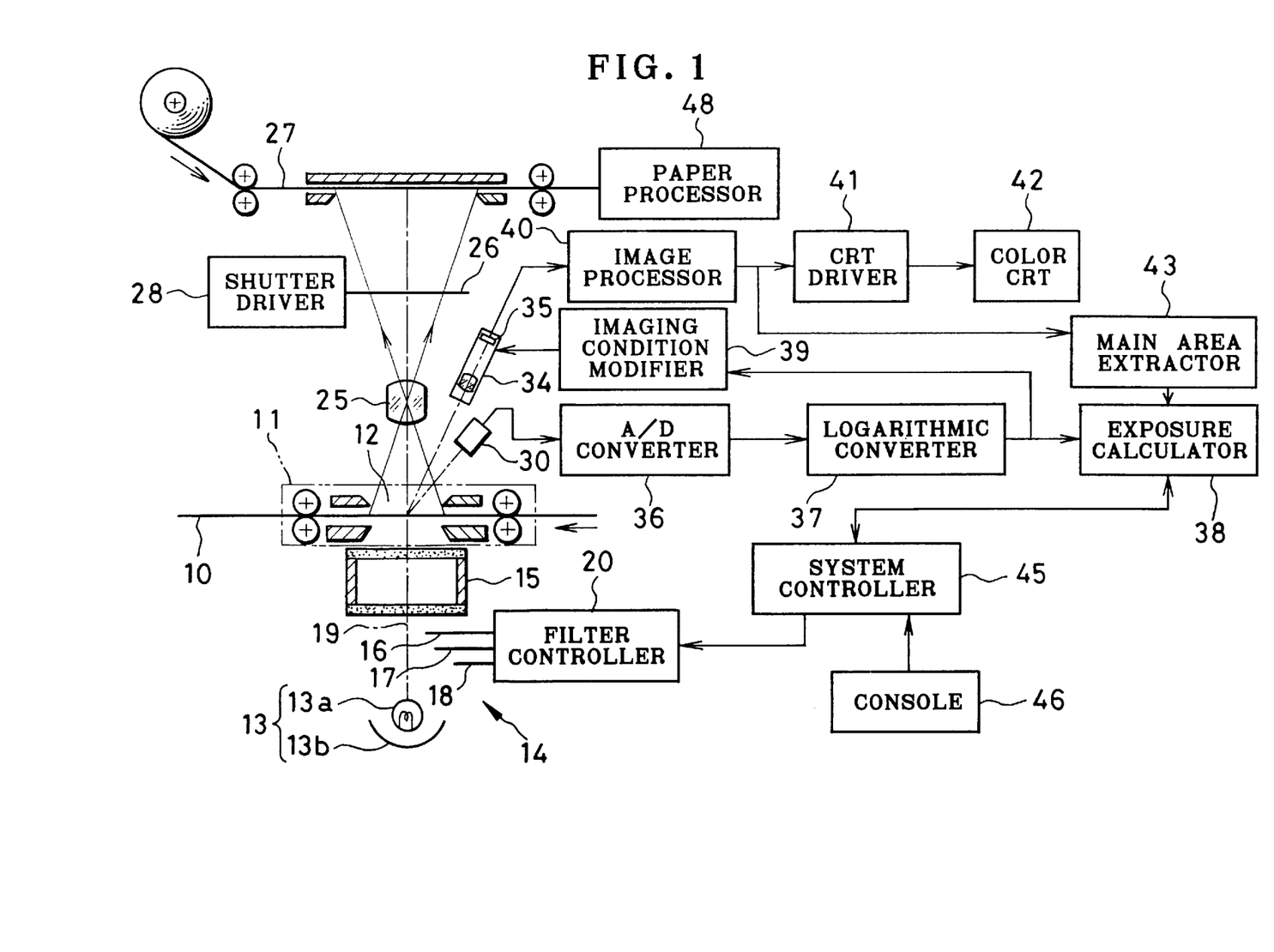
FIG. 1 is a schematic diagram of a printer-processor having an exposure control apparatus according to a first embodiment of the invention.

In a printer-processor of FIG. 1, a developed negative film 10 is inserted in a film carrier 11 which is located in a printing stage to seriatim position each frame on the negative film 10 in a mask aperture 12. A light source 13, a light quality control section 14 and a diffusion box 15 are disposed below the film carrier 11. The light source 13 is constituted of a white lamp 13a and a reflector 13b.

The light quality control section 14 is provided with yellow, magenta and cyan color correction filters 16, 17 and 18. The color correction filters 16 to 18 may be each individually set at any position in a range from a fully closed position where the filter is fully inserted in a printing light path 19, to a fully open position where the filter is completely away from the printing light path 19. A filter controller 20 controls or changes the respective positions of the color correction filters 16 to 18 by use of not-shown three pulse motors. The diffusion box 15 diffuses the printing light whose quality is controlled through the light quality control section 14, thereby to equally illuminate the whole area of the original frame in the mask aperture 12. The printing light passing through the negative film 10 is projected through a printing lens 25 onto a color photographic paper 27 while a shutter 26 is open. Thus, an image of the original frame is exposed on the color paper 27. A shutter driver 28 opens and closes the shutter 26.

Figure 2:
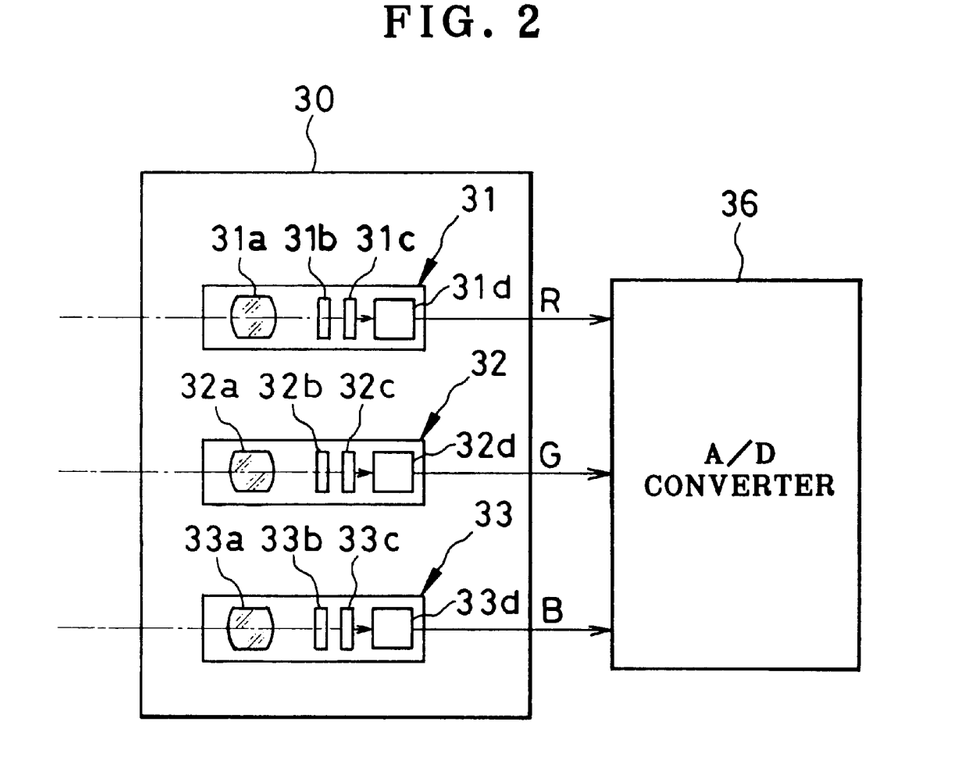
FIG. 2 is a block diagram of a photometric device of the exposure control apparatus of FIG. 1.

Diagonally above the original frame to be printed that is set in the mask aperture 12 of the film carrier 11, there are a photometric device 30 and an imaging device 34. As shown in FIG. 2, the photometric device 30 is provided with three photo sensors 31, 32 and 33 for red (R), green (G) and blue (B), so as to measure an average transmittance density, e.g. a large area transmittance density (LATD) of each color. Each of the photo sensors 31, 32 and 33 is constituted of an image forming lens 31a, 32a or 33a, a color filter 31b, 32b or 33b, a photo reception element 31c, 32c or 33c, and an amplifier 31d, 32d or 33d, respectively. The photo reception elements 31c, 32c and 33c are a photodiode or another photoelectric conversion element each, and each of the color filters 31b, 32b and 33b passes light of a particular wavelength range, i.e., red light, green light or blue light. The respective color filters 31b to 33b are color separation filters having deposit layers whose spectral characteristics are approximately equal to a spectral sensitivity of the color paper 27.

The amplifiers 31d to 33d amplify the output signals from the photo reception elements 31c to 33d, and send them to an A/D converter 36. The A/D converter 36 converts the amplified signals of an analog form into a digital form, and sends them to a logarithmic converter 37. The logarithmic converter 37 converts the digital signals into three color density signals, strictly speaking photometric gain values representative of logarithmic values of three color light quantities. The three color density signals are sent to an exposure calculator 38 and an imaging condition modifier 39.

Although the photometric device 30 and the imaging device 34 are disposed diagonally above the original frame to be printed, it is possible to place a half-mirror or a half-prism or the like in the printing light path 19 to split the printing light and direct toward the color paper 27, on one hand, and the photometric device 30 and the imaging device 34, on the other hand.

Figure 3:
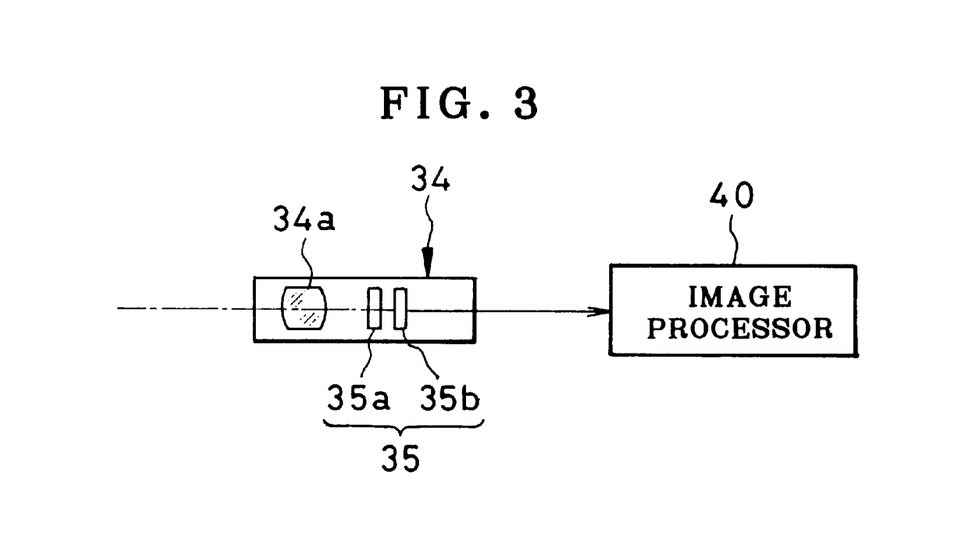
FIG. 3 is a block diagram of an imaging device of the exposure control apparatus of the first embodiment.

On the other hand, the imaging device 34 is to detect color image data useful for simulating a consequent photo-print, that is, for monitoring in advance the result of the printing. For this purpose, the imaging device 34 is constituted of an image forming lens 34a and a single chip color image area sensor 35, as shown in FIG. 3. The color image area sensor 35 may be a conventional single chip video sensor which is constituted of a charge coupled device (CCD) 35b having 800×500 pixels and a color separation filter 35a consisting of red, green and blue organic filters. The organic filters of three colors are arranged in a mosaic pattern in correspondence with the pixels of the CCD 35b.

Based on the photometric gain values of the signals from the photo sensors 31 to 33, the imaging condition modifier 39 changes the dynamic range of the imaging device 34 to be suitable for the density of the negative image of the original frame to be printed. Concretely, the imaging condition modifier 39 changes the charge storage time Ti of the color image area sensor 35 for each color by use of the following equation:

$$Ti = Tdpi \times 10^{DDi} \qquad (1)$$

wherein i represents R, G or B;

Tdpi represents a charge storage time for a standard negative frame having ideal properties; and DDi represents a difference between an average density of the original frame and an average density of the standard negative frame.

The charge storage time of the single chip image area sensor 35 having mosaic three color filters may be controlled independently of each color in the way as disclosed for example in U.S. Pat. Nos. 4,692,794 and 4,709,259. Since the color image area sensor 35 is driven to pick up the original frame at the charge storage time Ti that is determined for each color based on LATD of each color of the original frame, the color densities of the original frame do not adversely affect the color image data detected from the color image area sensor 35. On the contrary, any original frame can be picked up in a proper dynamic range for each color. Thereby, even though the original frame is over-exposed or under-exposed, the color image data from the color image area sensor 35 can be processed under the same condition as that of the standard normally exposed negative frame.

The color image data from the color image area sensor 35, i.e. the three color image data of the negative image detected through the imaging device 34, is subjected to a negative-to-positive conversion in an image processor 40, and is sent via a color cathode ray tube (CRT) driver 41 to a color CRT 42, which displays a positive image simulating a consequent photo-print of the original frame on the screen. The three color image data from the image processor 40 is also sent to a main area extractor 43, which determines a main area of the original frame based on the three color image data, and calculates image characteristic values, e.g. average densities, of the main area. The image characteristic values of the main area are sent to an exposure calculator 38. To determine a main area, those ranges of the three color image data which correspond to a fresh color range are predetermined, so that the pixels that belong to the fresh color range are extracted as fresh color pixels, as disclosed for example in JPA 52-156624 and JPA 52-156625. The color image data of each extracted pixel is inspected in view of other points, so as to extract a lump of fresh color pixels as the main area.

The exposure calculator 38 determines a basic exposure amount of each color based on the LATD of three colors, and exposure correction amounts based on the image characteristic values of the main area, and calculates three color print exposure amounts from the basic exposure amounts and the exposure correction amounts in accordance with well known exposure calculation formulas. In addition, it is possible to determine a print exposure amount based on the image characteristic values of the main area. Alternatively, a print exposure amount may be a weighted mean value of the basic exposure amount and the exposure correction amount, wherein the respective weighting coefficients varies depending upon the size of the main area or other factors. For example, the larger the main area is, the heavier the weight on the exposure correction amount as being based on the image characteristic values of the main area.

The print exposure amounts are sent from the exposure calculator 38 to a system controller 45, which then calculates the positions to set the color correction filters 16 to 18 based on the print exposure amounts. The system controller 45 also controls the respective portions according to a sequence. A console 46 is connected to the system controller 46 to allow the operator to enter necessary data or commands. For example, the operator can enter exposure correction data according to the result of observation of the simulation image on the color CRT 42. The filter controller 20 sets the color correction filters 16 to 18 to the positions determined by the system controller 45, to control the quality of the print light. The shutter 26 is opened for a given time to record an image of the original frame on the color paper 27 at a proper exposure. The exposed portion of the color paper 27 is sent to a paper processor 48 for development and other processes, to finish up a photo-print.

Figure 4:
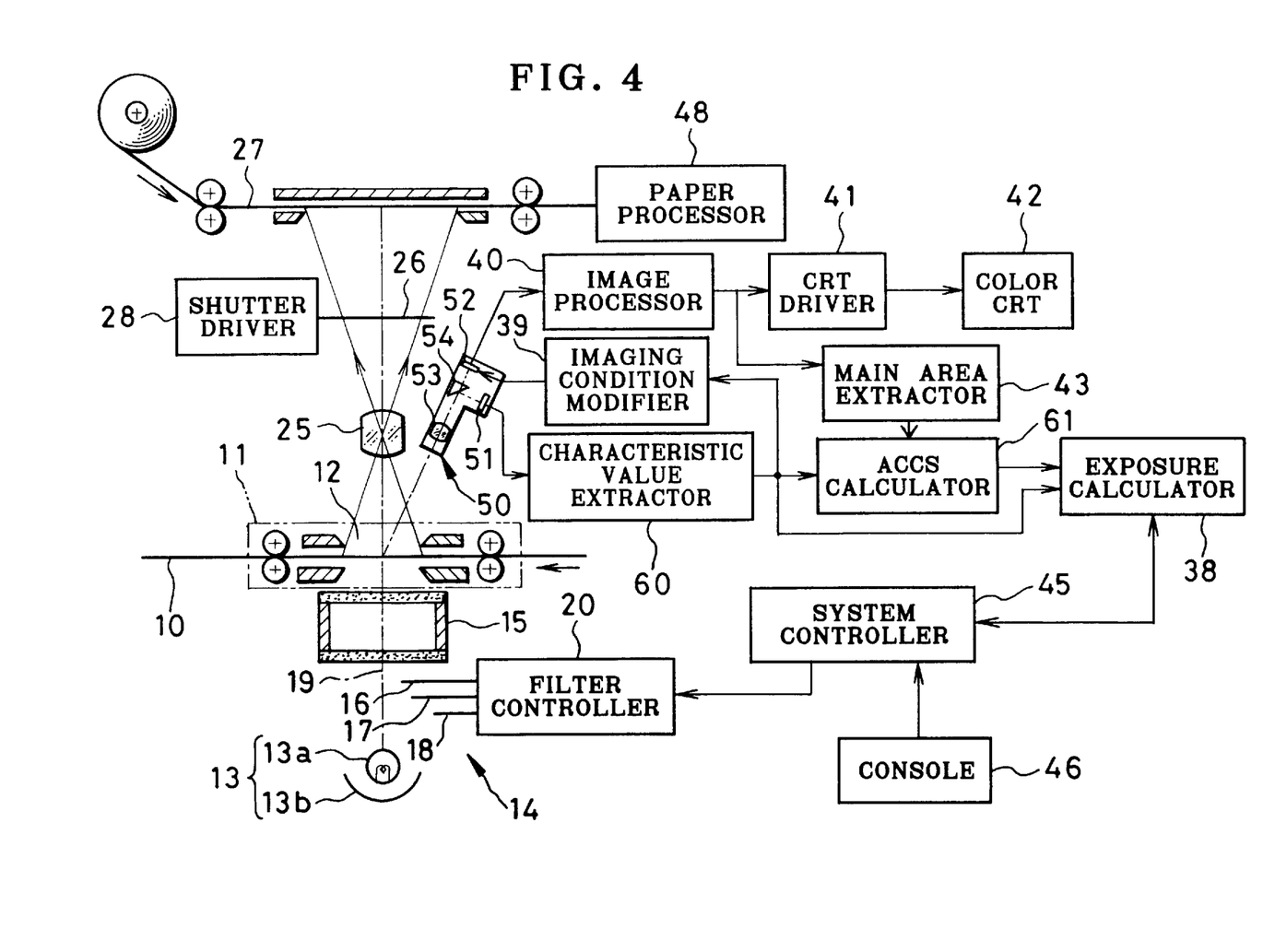
FIG. 4 is a schematic diagram of a printer-processor having an exposure control apparatus according to a second embodiment of the invention.

FIG. 4 shows a printer-processor according to another embodiment of the invention, wherein a developed negative film 10 is inserted in a film carrier 11 which seriatim positions each frame on the negative film 10 in a mask aperture 12. A light source 13, a light quality control section 14 and a diffusion box 15 are disposed below the film carrier 11. The light source 13 is constituted of a white lamp 13a and a reflector 13b.

The light quality control section 14 is provided with yellow, magenta and cyan color correction filters 16, 17 and 18. The color correction filters 16 to 18 may be each individually set at any position in a range from a fully closed position where the filter is fully inserted in a printing light path 19, to a fully open position where the filter is completely away from the printing light path 19. A filter controller 20 controls or changes the respective positions of the color correction filters 16 to 18 by use of not-shown three pulse motors. The diffusion box 15 diffuses the printing light whose quality is controlled through the light quality control section 14, thereby to equally illuminate the whole area of the original frame in the mask aperture 12. The printing light passing through the negative film 10 is projected through a printing lens 25 onto a color photographic paper 27 while a shutter 26 is open. Thus, an image of the original frame is exposed on the color paper 27. A shutter driver 28 opens and closes the shutter 26.

Figure 5:
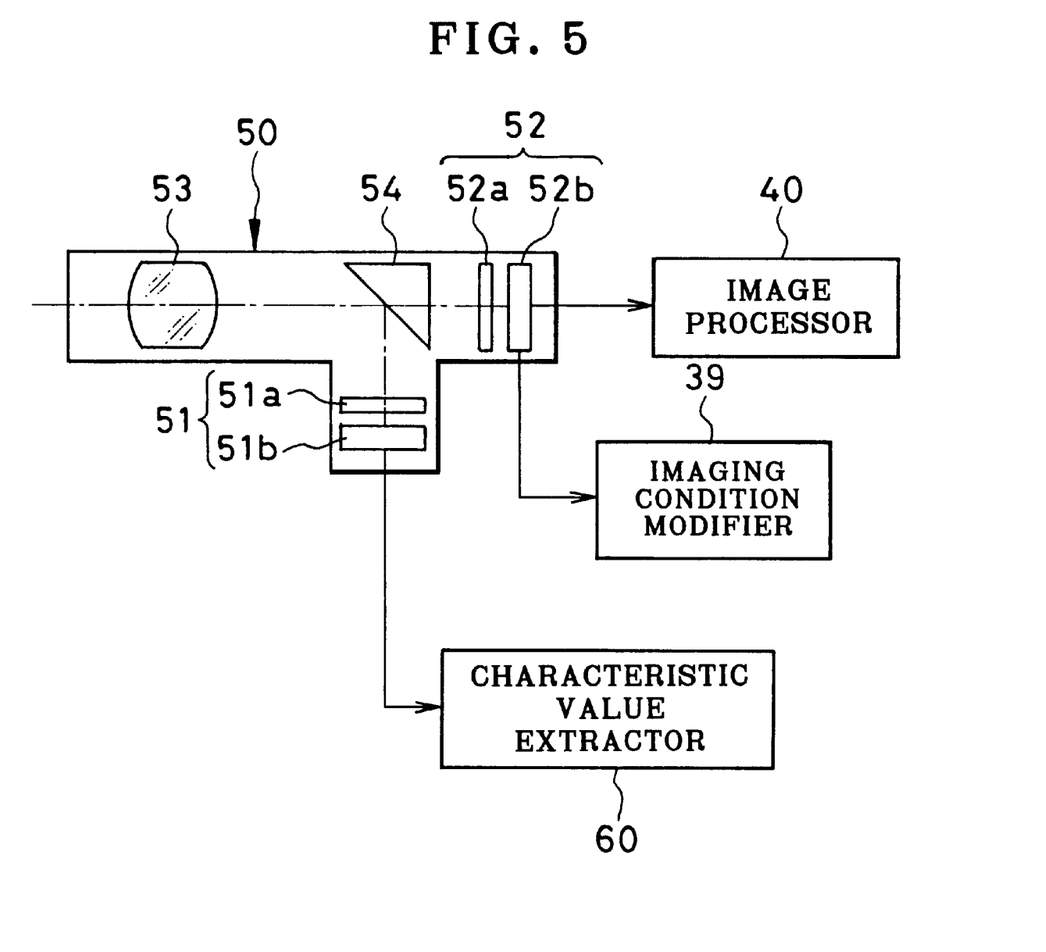
FIG. 5 is a block diagram of an image sensor unit including a couple of color image area sensors as a photometric device and an imaging device, provided in the exposure control apparatus of the second embodiment.

An image sensor unit 50 is disposed diagonally above the original frame set in the mask aperture 12. The image sensor unit 50 includes a first color image area sensor 51 as a photometric device for measuring three color densities of the original frame. The image sensor unit 50 further includes a second color image area sensor 52 as an imaging device of a monitoring system to detect color image data for simulating a consequent photo-print, and also an image forming lens 53 and a half-prism 54. The half-prism 54 functions as a beam splitter for splitting light from the image forming lens 53 into halves and directing them toward the first and second color image area sensors 51 and 52.

The second color image area sensor 52 as the imaging device of the monitoring system is a conventional single chip video sensor which is constituted of a charge coupled device (CCD) 52b having 800×500 pixels and a color separation filter 52a consisting of red, green and blue organic filters. The organic filters of three colors are arranged in a mosaic pattern in correspondence with the pixels of the CCD 52b.

The first color image area sensor 51 is a single chip video sensor having a relatively small number of pixels, e.g. about 25×25 pixels, which is constituted of a color separation filter 51a and a charge coupled device (CCD) 51b. The color separation filter 51a consists of red, green and blue deposit layers which are arranged in a mosaic pattern in correspondence with the pixels of the CCD 51b. The single chip color image area sensors 51 and 52 allow to control the charge storage time independently of each color, in the same way as the color image area sensor 35. Since the color image area sensor 51 can measure the light in a higher dynamic range, it is possible to use the output signals of the color image area sensor 51 as data for controlling exposure.

As described above, it is difficult to produce a color separation filter consisting three color filters arranged in a mosaic pattern from deposit layers when the color image area sensor should have a large number of pixels.

According to the present embodiment, the number of pixels of the color image area sensor 51 is in the range of hundreds, and hence the size of each pixel can be relatively large, so that it is easy to produce the color separation filter 51a from the deposit layers. The deposit layers for red, green and blue can be easily adapted to have spectral characteristics that are approximately equal to the spectral sensitivity of the color paper 27. The output signals of the color image area sensor 51 are sent to a characteristic value extractor 60.

The characteristic value extractor 60 converts the output signal from an analog form into a digital form, and then effects a logarithmic conversion of the output signals into photometric density signals, strictly speaking photometric gain values representative of logarithmic values of three color light quantities. From the photometric density signals, the characteristic value extractor 60 extracts image characteristic values including LATD, maximum and minimum densities and an average density of each color among of the 25 ×25 pixels. These image characteristic values are sent to a correction amount calculator or ACCS calculator 61, an exposure calculator 38 and an imaging condition modifier 39.

The correction amount calculator 61 is a computerized automatic negative inspection system, which discriminates based on the image characteristic values various patterns of the subjects of the original frames, and selects a suitable exposure correction amount operation formula among from those predetermined for the respective patterns. Therefore, the correction amount calculator 61 will be referred to as ACCS (Advanced Computerized Color Scanner) calculator 61. Exposure correction amounts are calculated from those characteristic values which are detected from a main area of the original frame. The main area is determined in a manner as set forth below. The exposure correction amounts are sent to the exposure calculator 38.

Based on the photometric gain values of the three color average transmittance density signals from the characteristic value extractor 60, the imaging condition modifier 39 changes the dynamic range of the second color image area sensor 52 to be suitable for the density of the negative image of the original frame to be printed. Concretely, the imaging condition modifier 39 changes the charge storage time Ti of the second color image area sensor 52 by use of the above equation (1).

Since the second color image area sensor 52 is driven to pick up the original frame at the charge storage time Ti that is determined based on the three color LATD of the original frame, the color densities of the original frame do not adversely affect the color image data detected from the second color image area sensor 52. On the contrary, any original frame can be picked up in a proper dynamic range. Thereby, even though the original frame is over-exposed or under-exposed, the color image data from the color image area sensor 52 can be processed under the same condition as that of the standard normally exposed negative frame.

The three color image data from the color image area sensor 52 is subjected to a negative-to-positive conversion in an image processor 40, and is sent via a color cathode ray tube (CRT) driver 41 to a color CRT 42, which displays a positive image simulating a consequent photo-print of the original frame on the screen. The three color image data from the image processor 40 is also sent to a main area extractor 43, which determines a main area of the original frame based on the three color image data, e.g. by extracting fresh color pixels in the same way as above. The extracted signals representative of the main area are sent to the ACCS calculator 61. The ACCS calculator 61 calculates correction amounts from image characteristic values of the main area by use of the calculation formulas that are selected according to the pattern of the subject of the original frame.

The exposure calculator 38 determines basic exposure amounts based on the three color LATD detected from the characteristic value extractor 60, and calculates a print exposure amount of each color from the basic exposure amount and the exposure correction amount determined by the ACCS calculator 61. It is also possible to extract image characteristic values of the main area in the characteristic value extractor 60, and determine print exposure amounts based on the image characteristic values of the main area. Alternatively, a print exposure amount may be a weighted mean value of the basic exposure amount and the exposure correction amount, wherein the respective weighting coefficients varies depending upon the size of the main area or other factors. For example, the larger the main area is, the heavier the weight on the exposure correction amount as being based on the image characteristic values of the main area. The exposure correction amount from the ACCS calculator 61 corrects density failure or color failure, if any, of the original frame with accuracy.

The print exposure amounts are sent from the exposure calculator 38 to a system controller 45, which then calculates the positions to set the color correction filters 16 to 18 based on the print exposure amounts. The system controller 45 also controls the respective portions according to a sequence. A console 46 is connected to the system controller 46 to allow the operator to enter necessary data or command. For example, the operator can enter exposure correction data according to the result of observation of the simulation image on the color CRT 42. But the console 46 can be omitted. The filter controller 20 sets the color correction filters 16 to 18 to the positions determined by the system controller 45, to control the quality of the print light. The shutter 26 is opened for a given time to record an image of the original frame o the color paper 27 at a proper exposure. The exposed portion of the color paper 27 is sent to a paper processor 48 for development and other processes, to finish up a photo-print.

According to the above embodiments, the imaging condition modifier 39 adjusts the dynamic range of the color image area sensor 35 or 52 of the monitoring system to the density of the original frame by changing the charge storage time Ti depending upon the three color average densities that are detected through the photometric device 30 or the second color image area sensor 52. However, it is possible to adjust the quantity of printing light projected onto the original frame to the dynamic range of the color image area sensor 35 or 52.

The light quantity can be controlled through the positions of the color correction filters 16 to 18 when the white lamp 13a is used as the single light source lamp. In a printer where three lamps are provided for the three colors, the voltage of each lamp may be controlled to control the light quantity from the light source. In either case, it is preferable to store a look-up table (LUT) showing a relationship between control variances and the light quantities of the three colors, and control the light quantities based on the control variance determined with reference to the LUT. The control variance is the positions of the color correction filters 16 to 18, or the lamp voltages of the respective colors.

Specifically, the light quantity Pi, i=R, G or B, of the light source is determined according to the following equation (2):

$$Pi = Pdpi \times 10^{DDi} \qquad (2)$$

wherein

Tdpi represents a charge storage time for a standard negative frame having ideal properties; and DDi represents a difference between an average density of the original frame and an average density of the standard negative frame.

Although the second embodiment shown in FIGS. 4 and 5 uses the image forming lens 53 commonly to both the photometric device and the imaging device, i.e. the color image area sensors 51 and 52, it is possible to use a specific image forming lens to each photometric device. The half-prism 54 may be replaced by a half-mirror.

The present invention has been described with respect to a printer-processor which is directed to a small photo-lab. But the present invention is applicable to a large scale automatic printer which is used in a large scale photo-lab. The present invention is also applicable to a film analyzer. It is possible to omit the color CRT 42 and the CRT driver 41, to determine print-exposure amounts completely automatically.

In the above embodiments, both the photometric device and the imaging device are disposed diagonally above the original frame, and in an upstream position of the printing stage in view of the film advancing direction indicated by an arrow in the drawings. It is possible to dispose the photometric device and the imaging device in a downstream position of the printing stage. Alternatively, the photometric device and the imaging device may be disposed before and behind the printing stage, respectively. In that case, it is preferable to locate the photometric device in the upstream position, so that the imaging device of the monitoring system can pick up color image data in an appropriate dynamic range that is determined according to the result of the photometry through the photometric device. Thereby, the exposure calculation based on the color densities and the main area extraction based on the color image data may be carried out in parallel, to save the processing time.

Thus, the present invention should not be limited to the above described embodiments but, on the contrary, various modification may be possible to those skilled in the art without departing from the scope of claims attached hereto.

What is claimed is:

1. An exposure control apparatus for photo-print comprising:
    a photometric device for measuring three color densities of an original frame recorded on photo film;
    an imaging device for detecting three color image data of the original frame to use for displaying a video image;
    a condition determining device for determining image conditions of the imaging device in accordance with the three color densities measured by the photometric device;
    a main area extracting device for extracting a main area of the original frame based on the color image data detected through the imaging device under the determined imaging conditions and for calculating image characteristic values of the main area based on the color image data; and
    an exposure determining device for determining print-exposure amounts by using the image characteristic values of the main area from the main area extracting device and the three color densities measured by the photometric device.

2. An exposure control apparatus according to claim 1, further comprises a display device that simulates a consequent photo-print of the original frame based on the color image data detected by the imaging device.

3. An exposure control apparatus according to claim 1, wherein the condition determining device determines one of a charge storage time for each color of the imaging device and a light quantity of each color projected onto the original frame.

4. An exposure control apparatus having a display device for displaying a video image that simulates a consequent photo-print of an original frame recorded on photo film, based on color image data detected from the original frame, the exposure control apparatus comprising:
    a single chip color image area sensor for detecting the color image data from the original frame;
    a photometric device for measuring three color densities of the original frame, the photometric device having spectral characteristics that are approximately equal to a spectral sensitivity of a color paper to record the photo-print thereon;
    a condition determining device for determining imaging conditions of the single chip color image area sensor in accordance with the three color densities of the original frame;
    a main area extracting device for extracting a main area of the original frame based on the color image data detected through the single chip color image area sensor under the determined imaging conditions and for calculating image characteristic values of the main area based on the color image data; and
    an exposure determining device for determining print-exposure amounts by using the image characteristic values of the main area from the main area extracting device and the three color densities measured by the photometric device.

5. An exposure control apparatus according to claim 4, wherein the single chip color image area sensor comprises a color separation filter consisting of organic three color filters arranged in a mosaic pattern, while the photometric device comprises three photo sensors for the three colors, each of the three photo sensors comprising a photoelectric element and a color deposit filter disposed in front of the photoelectric element, the three color deposit filters having spectral characteristics which are approximately equal to the spectral sensitivity of the color paper.

6. An exposure control apparatus according to claim 5, wherein the condition determining device determines one of a charge storage time for each color of the single chip color image area sensor and a light quantity of each color projected onto the original frame.

7. An exposure control apparatus having a display device for displaying a video image that simulates a consequent photo-print of an original frame recorded on photo film, based on first color image data detected from the original frame, the exposure control apparatus comprising:
    a first single chip color image area sensor for detecting second image data from the original frame to obtaining image characteristic values of the original frame, the first single chip color image area sensor having a smaller number of pixels than necessary for detecting the first color image data useful for simulating the photo-print,
    a second single chip color image area sensor for detecting the first color image data from the original frame, the second single chip color image area sensor having a large number of pixels necessary for detecting the useful color image data;
    a condition determining device for determining imaging conditions of the second single chip color image area sensor in accordance with the image characteristic values of the original frame;

a main area extracting device for extracting a main area of the original frame based on the first color image data detected through the second single chip color image area sensor under the determined imaging conditions;

a calculating device for calculating image characteristic values of the main area extracted by said main area extracting device based on the second image data of said first single chip; and an exposure determining device for determining print-exposure amounts by using the image characteristic values of the main area from the calculating device and the three color densities of the main area.

8. An exposure control apparatus according to claim 7, wherein the second single chip color image area sensor comprises a color separation filter consisting of organic three color filters arranged in a mosaic pattern in correspondence with the pixels of the second single chip color image area sensor, while the first single chip color image area sensor comprises a color separation filter consisting of three color deposit filters arranged in a mosaic pattern in correspondence with the pixels of the first single chip color image area sensor, the three color deposit filters having spectral characteristics which are approximately equal to a spectral sensitivity of a color paper to record the photo-print thereon.

9. An exposure control apparatus according to claim 7, further comprising an image forming lens and a beam splitter for splitting light traveling through the original frame and the image forming lens into halves and directing them to the first and second single chip color image area sensors.

10. An exposure control apparatus according to claim 7, wherein the condition determining device determines one of a charge storage time for each color of the second single chip color image area sensor and a light quantity of each color projected onto the original frame.

11. An exposure control apparatus according to claim 10, wherein the image characteristic values include three color average transmittance densities, and maximum and minimum densities of each color.

12. An exposure control apparatus for a photo-print comprising:

a photometric device which measures an average transmittance density of three colors from an original frame for a photo film containing a negative image, and outputs and amplifies signals corresponding to said three color average transmittance density;

an A/D converter which converts the amplified signals into digital form;

a logarithmic converter which converts the digital signals from the A/D converter into three color density signals which correspond to photometric gain values representative of logarithmic values of three color light quantities;

an imaging device which detects three color image data from the negative image of the original frame recorded on photo film;

an image condition modifier which receives the three color density signals, which correspond to the photometric gain values, from the logarithmic converter, and which arranges an output level of the color image data of the imaging device with reference to a density of the negative image of the original frame recorded on photo film;

an image processor which subjects the three color image data of the negative image of the original frame detected through the imaging device to a negative-to-positive conversion;

a display having a screen which displays a positive image simulating the photo-print of the original frame on the screen;

a main area extractor which takes the three color image data from the image processor and determines a main area of the original frame based on the three color image data, and calculates image characteristic values of the main area;

an exposure calculator which receives the image characteristic values from the main area extractor and determines a basic exposure amount of each of the three colors based on the transmittance density of the three colors introduced into the exposure calculator as the three color density signals from the logarithmic converter, the exposure calculator also determining exposure correction amounts based on the image characteristic values of the main area, the exposure calculator calculating three color print exposure amounts from the basic exposure amounts and exposure correction amounts, to determine a print exposure amount based on the image characteristic values of the main area; and a system controller which calculates positioning of color correction filters to control a quality of print light based on the print exposure amounts.

13. An exposure control apparatus having a display device for displaying a video image that simulates a consequent photo-print of an original frame recorded on photo film, based on color image data detected from the original frame, the exposure control apparatus comprising:

a first single chip color image area sensor for obtaining image characteristic values of the original frame, the first single chip color image area sensor having a smaller number of pixels than necessary for detecting color image data useful for simulating the photo-print;

a second single chip color image area sensor for detecting the color image data from the original frame, the second single chip color image area sensor having a large number of pixels necessary for detecting the useful color image data;

a condition determining device for determining imaging conditions of the second single chip color image area sensor in accordance with the image characteristic values of the original frame;

a main area extracting device for extracting a main area of the original frame based on the color image data detected through the second single chip color image area sensor under the determined imaging conditions; and an exposure determining device for determining print-exposure amounts by use of three color densities of the main area;

wherein the condition determining device determines one of a charge storage time for each color of the second single chip color image area sensor and a light quantity of each color projected onto the original frame; and wherein the image characteristic values include three color average transmittance densities, and maximum and minimum densities of each color; and wherein the condition determining device determines a charge storage time of a charge coupled device of the second single chip color image area sensor in accordance with the following equation:

$$Ti = Tdpi \times 10^{DDi}$$

wherein

Ti represents the charge storage time;

i represents one of the three colors;

Tdpi represents a standard charge storage time predetermined for a standard frame; and DDi represents a difference between an average transmittance density of the original frame and an average transmittance density of the standard frame.

14. An exposure control apparatus having a display device for displaying a video image that simulates a consequent photo-print of an original frame recorded on photo film, based on color image data detected from the original frame, the exposure control apparatus comprising:

a first single chip color image area sensor for obtaining image characteristic values of the original frame, the first single chip color image area sensor having a smaller number of pixels than necessary for detecting color image data useful for simulating the photo-print;

a second single chip color image area sensor for detecting the color image data from the original frame, the second single chip color image area sensor having a large number of pixels necessary for detecting the useful color image data;

a condition determining device for determining imaging conditions of the second single chip color image area sensor in accordance with the image characteristic values of the original frame;

a main area extracting device for extracting a main area of the original frame based on the color image data detected through the second single chip color image area sensor under the determined imaging conditions; and an exposure determining device for determining print-exposure amounts by use of three color densities of the main area;

wherein the condition determining device determines one of a charge storage time for each color of the second single chip color image area sensor and a light quantity of each color projected onto the original frame; and wherein the image characteristic values include three color average transmittance densities, and maximum and minimum densities of each color; and wherein the condition determining device determines a quantity of printing light from a light source of the printer in accordance with the following equation:

$$Pi = Pdpi \times 10^{DDi}$$

wherein

Pi represents the quantity of printing light;

i represents one of the three colors;

Pdpi represents a standard printing light quantity predetermined for a standard frame; and DDi represents a difference between an average transmittance density of the original frame and an average transmittance density of the standard frame.

* * * * *